(12) United States Patent
Ellore Sreenath et al.

(10) Patent No.: US 11,099,873 B2
(45) Date of Patent: Aug. 24, 2021

(54) NETWORK CONFIGURATION UPDATES FOR VIRTUAL MACHINE

(71) Applicant: Microsoft Technology Licensing, LLC, Redmond, WA (US)

(72) Inventors: Abhishek Ellore Sreenath, Bengaluru (IN); Madhan Sivakumar, Seattle, WA (US); Abhishek Shukla, Redmond, WA (US); Rishabh Tewari, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 212 days.

(21) Appl. No.: 16/240,599

(22) Filed: Jan. 4, 2019

(65) Prior Publication Data
US 2020/0218558 A1    Jul. 9, 2020

(51) Int. Cl.
*G06F 9/455* (2018.01)
*H04L 12/24* (2006.01)
*H04L 29/12* (2006.01)

(52) U.S. Cl.
CPC ...... *G06F 9/45558* (2013.01); *H04L 41/0876* (2013.01); *H04L 61/2076* (2013.01); *G06F 2009/45595* (2013.01)

(58) Field of Classification Search
CPC ............ G06F 9/45558; H04L 41/0876; H04L 61/2076
See application file for complete search history.

(56) References Cited

U.S. PATENT DOCUMENTS

| | | | | |
|---|---|---|---|---|
| 8,964,735 B2 * | 2/2015 | Ackley | ................... | H04L 45/64 370/389 |
| 9,674,103 B2 * | 6/2017 | Brown | .................. | H04L 47/323 |
| 10,698,709 B2 * | 6/2020 | Korbar | .................. | G06F 9/4401 |
| 2006/0090023 A1 * | 4/2006 | Olsen | .................... | G06F 21/554 710/107 |

(Continued)

OTHER PUBLICATIONS

Achleitner, et al., "Fast Network Configuration in Software Defined Networking", In Journal of IEEE Transactions on Network and Service Management, vol. 15, Issue 4, Dec. 2018, pp. 1249-1263.

(Continued)

*Primary Examiner* — Esther B. Henderson
*Assistant Examiner* — Nazia Naoreen
(74) *Attorney, Agent, or Firm* — Newport IP, LLC; Han Gim (57) ABSTRACT

A method to provide network connectivity to a virtual machine hosted on a server computer system includes detecting a change in a configuration of a software-defined network to which the server computer system provides access; issuing a network configuration update (NCU) for consumption by the virtual machine, the NCU including a data structure reflecting the change in the configuration; and providing a link-state notification (LSN) to a virtual network interface card of the virtual machine pursuant to the change in the configuration, the LSN including data indicating a state of network connectivity of the virtual machine. Receipt of the LSN triggers a dynamic host-configuration protocol (DHCP) handshake by the virtual machine; the NCU is received by the virtual machine pursuant to the DHCP handshake.

20 Claims, 6 Drawing Sheets

(56) References Cited

U.S. PATENT DOCUMENTS

| | | | |
|---|---|---|---|
| 2007/0101323 A1* | 5/2007 | Foley | H04L 61/2084 718/1 |
| 2008/0109539 A1* | 5/2008 | Foster | H04L 41/082 709/221 |
| 2015/0127830 A1 | 5/2015 | Brown et al. | |
| 2016/0337937 A1 | 11/2016 | Mccann et al. | |
| 2018/0359145 A1 | 12/2018 | Bansal et al. | |

OTHER PUBLICATIONS

"International Search Report & Written Opinion issued in PCT Application No. PCT/US19/067301", dated Apr. 17, 2020, 14 Pages.

* cited by examiner

NETWORK CONFIGURATION UPDATES FOR VIRTUAL MACHINE

BACKGROUND

Software-defined networking (SDN) is an emerging architecture that decouples network control from the forwarding functions of a network. It enables the control functions to be directly programmable and the underlying infrastructure to be abstracted for applications and network services. Abstraction of the infrastructure allows administrators to dynamically adjust network-wide traffic flow to meet changing needs. In some examples, a centralized, software-based SDN controller may appear to applications and policy engines as a logical switch that provides network access.

SUMMARY

One aspect of this disclosure is directed a method enacted by a server computer system to provide network connectivity to a virtual machine hosted on the server computer system. The method includes detecting a change in a configuration of a software-defined network to which the server computer system provides access and issuing a network configuration update (NCU) for consumption by the virtual machine, the NCU including a data structure reflecting the change in the configuration. The method also includes providing a link-state notification (LSN) to a virtual network interface card of the virtual machine pursuant to the change in the configuration, the LSN including data indicating a state of network connectivity of the virtual machine. As described in further detail herein, receipt of the LSN triggers a dynamic host-configuration protocol (DHCP) handshake by the virtual machine. The NCU is received by the virtual machine pursuant to the DHCP handshake.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
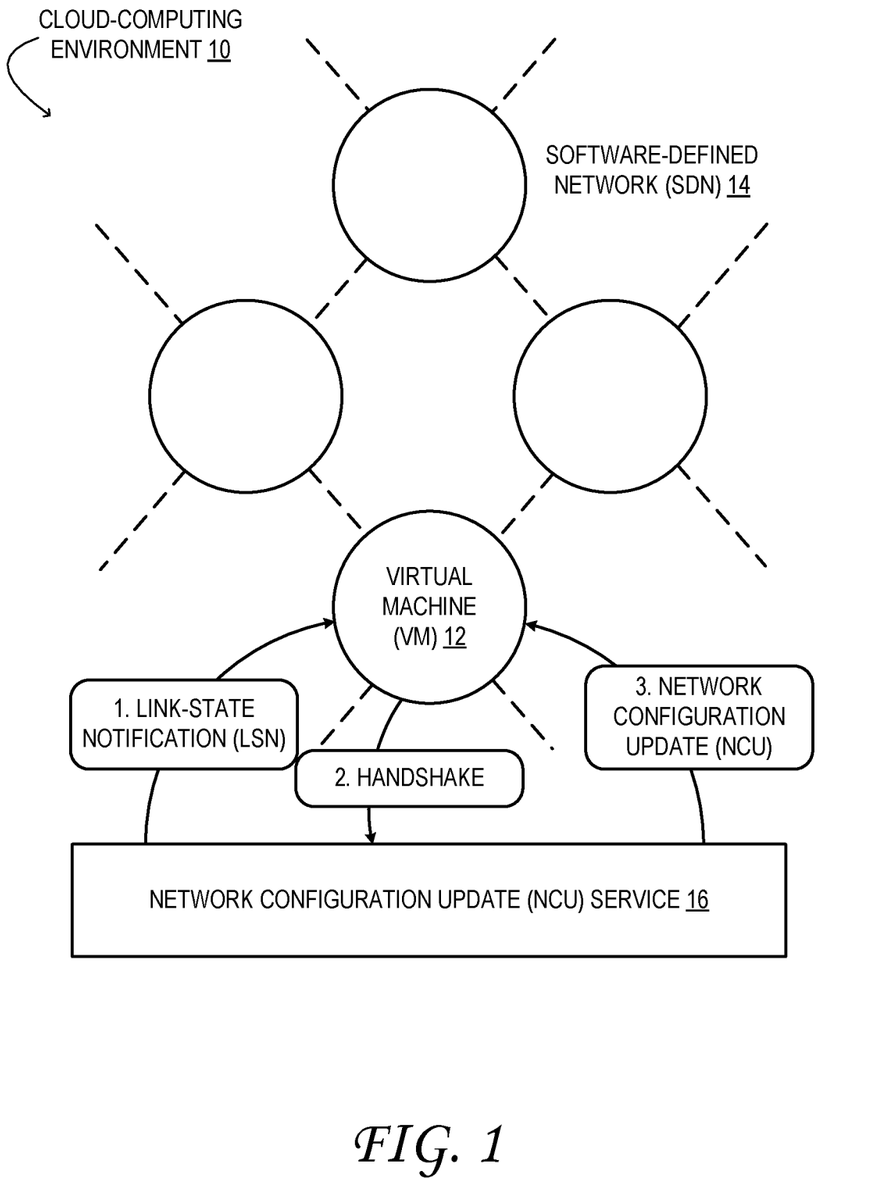
FIG. 1 schematically illustrates retrieval of a network configuration update by a virtual machine residing on a software-defined network.

A cloud-computing environment may include a host server system and a plurality of networked client devices. The client devices may be permitted to access certain resources of the host server system, such as processing, network, and/or data-storage resources. To this end, the host server system may instantiate and host one or more 'virtual machines' (VMs), allowing authorized client devices network access to the VMs. More particularly, one or more of the VMs may be configured as nodes on a software-defined network (SDN). FIG. 1 shows aspects of an example cloud-computing environment 10, with a virtual machine 12 configured as a node of SDN 14.

As noted above, software-defined networking is an emerging architecture that decouples network control from the forwarding functions of a network. It enables network-control functions to be directly programmable and the underlying infrastructure to be abstracted for applications and network services. Abstraction of the infrastructure allows administrators to dynamically adjust network-wide traffic flow to meet changing needs. Because the forwarding operation is effectively decoupled from the routing operation, an SDN may be reconfigured with remarkable flexibility to reflect changing conditions. However, in order to maintain network access, each VM must be made aware of real-time changes to the network configuration.

As described in greater detail herein, the host server system of a cloud-computing environment may issue a network configuration update (NCU) pursuant to any reconfiguration of an SDN. In the example of FIG. 1, the NCU is issued by NCU service 16 of a host server system. The NCU may be retrieved by recipient VMs via a standard dynamic host configuration protocol (DHCP). DHCP, however, is typically a client-initiated protocol. In the absence of any notification that a new NCU is available for consumption, a networked VM cannot be relied upon to spontaneously initiate a DHCP handshake and thereby retrieve the NCU. Accordingly, in the examples here disclosed, the NCU service of host server system initiates the network-update process by issuing a link-state notification (LSN) to recipient VMs. The LSN may 'appear' to the operating system of a recipient VM as though a network cable were suddenly connected; it thereby triggers the VM to initiate a DHCP handshake, through which the NCU is retrieved. In this manner, the LSN prompts each recipient VM to retrieve the available NCU via the standard DHCP protocol. This scenario is illustrated in FIG. 1, where receipt of the LSN by the recipient VM automatically triggers a new DHCP request, or 'handshake,' by the VM. The NCU is then delivered in the subsequent DHCP exchange.

Figure 2:
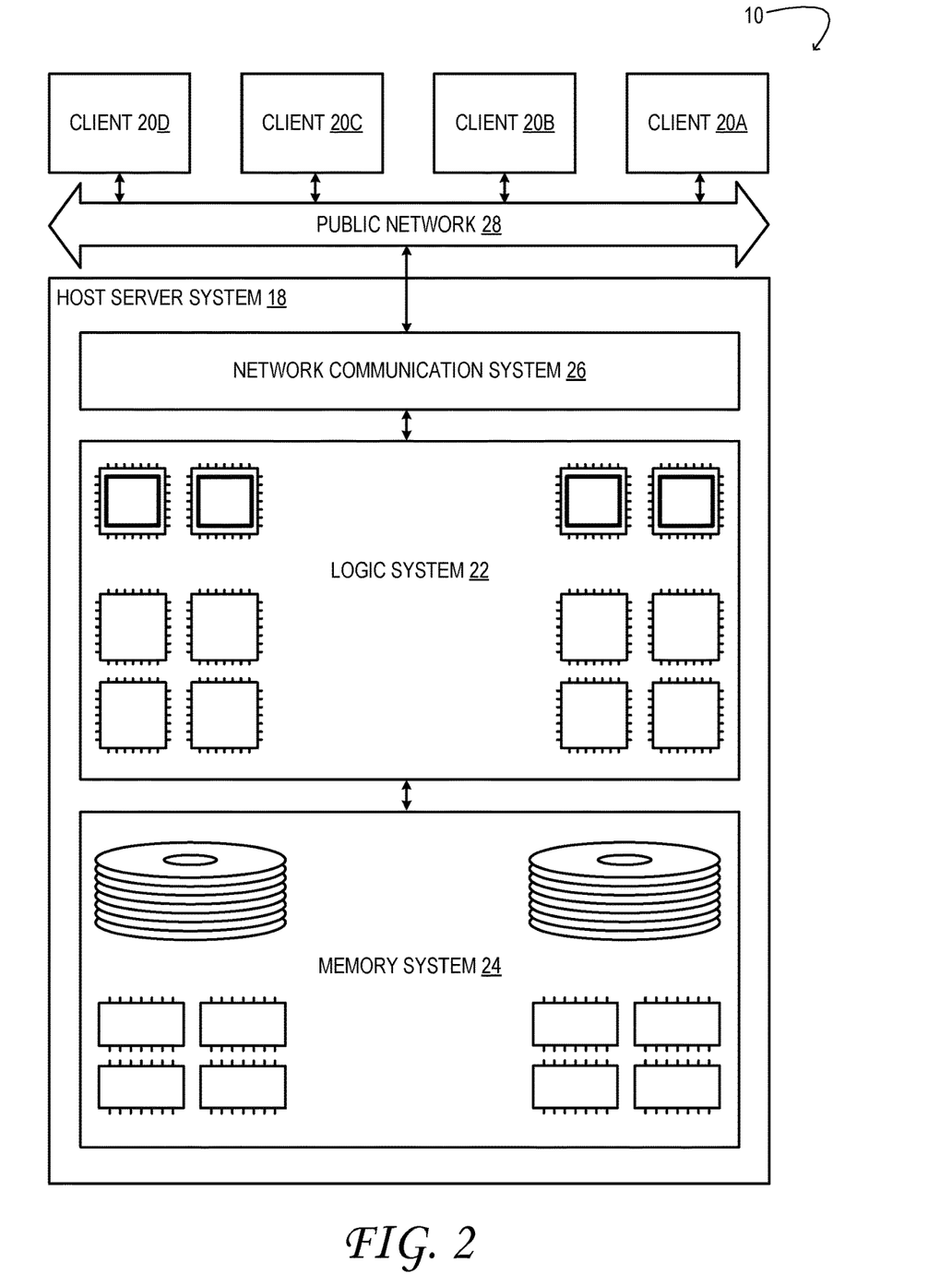
FIGS. 2 and 3 show aspects of an example cloud-computing environment.

FIG. 2 shows additional aspects of example cloud-computing environment 10 in schematic detail. In this nonlimiting example, the cloud-computing environment includes an example host server system 18 and a plurality of client devices 20 (client device 20A, 20B, etc.). The example host server system includes a distributed logic system 22 comprising a series of multicore central processing units (CPUs) and graphics processing units (GPUs). The example host server system includes a distributed computer-memory system 24 of data- and instruction-storage subsystems. The subsystems of the computer-memory system may differ with respect to data-storage capacity and storage-retrieval latency. For instance, the computer-memory system may include an optical data-storage subsystem of very high capacity and relatively high latency, and a flash-memory subsystem of lower capacity and much lower latency.

Example host server system 18 also includes a network-communication system 26 configured for high-speed, high-bandwidth network connectivity. In some examples, the network-communication system may support bidirectional, high-speed internet connectivity via cable and/or fiber-optic transmission. In FIG. 2, the example host server system is illustrated as a unitary structure, but that aspect is not strictly necessary. In some examples, the various components of the host server system may be distributed geographically and coupled operatively via distributed componentry of the network-communication system.

Client devices 20 may include virtually any type of computer device having network connectivity. A client device may have a display and a keyboard, and/or other componentry to enable direct user interaction. As nonlimiting examples of client devices, desktop, laptop, and tablet computers, smart phones, gaming consoles, mainframes, mainframe terminals, and other types of client devices are all equally envisaged. Although only four client devices are represented in FIG. 2, the number of client devices in cloud-computing environment 10 is not particularly limited.

Via a secure network protocol conveyed over public network 28, each client device 20 may access a portion of the computer resources of host server system 18. Such resources may include processing resources, data and data-storage resources, and network resources, for instance. In one example, client devices 20A and 20B may use one portion of the host server system to coordinate an e-commerce operation. Concurrently, client device 20C may use another portion of the host server system to execute sophisticated quantum-chemistry computations directed to drug discovery.

Figure 3:
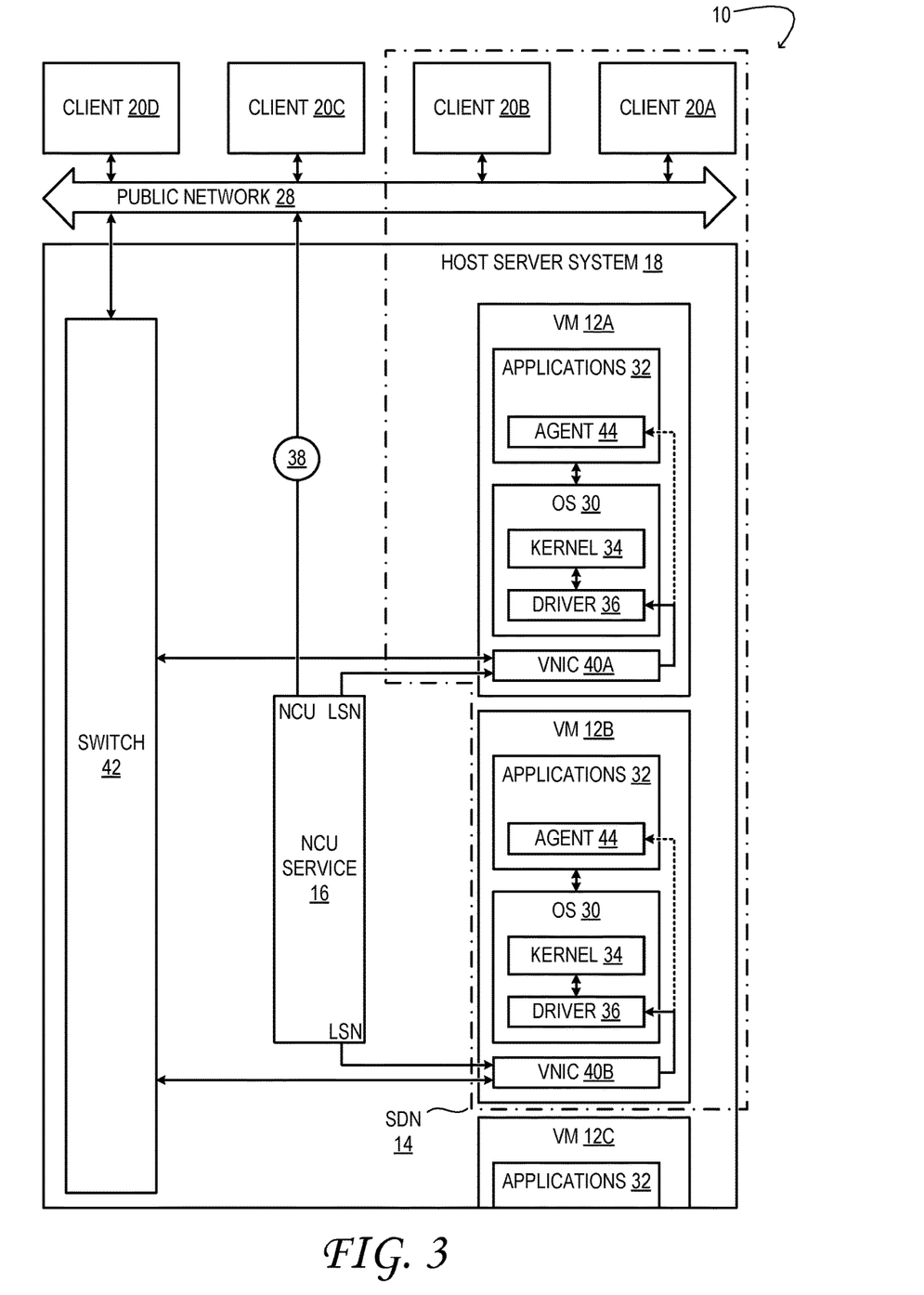

To these ends and others, host server system 18 may be configured to emulate the operation of a hypothetical series of nominally independent computer systems, each accessed by one or more client devices 20. This aspect is illustrated in FIG. 3, which provides another schematic illustration of cloud-computing environment 10. Here and elsewhere, each of the emulated computer systems is referred to as a 'virtual machine' (VM), which is 'hosted' by the host server system. FIG. 3 shows VMs 12A, 12B, and 12C; in other examples, additional VMs or fewer VMs (as few as one) may be hosted, and the number of hosted VMs may be adjusted as desired. In some examples, each VM 12 is configured, via software executing on host server system 18, to operate like a personal computer (PC) or workstation. In particular, each VM may execute an operating system (OS) 30 of a PC or workstation, in addition to any applications 32 supported by the OS, but with enhanced processing power, data-storage, and/or network bandwidth. In some examples, the OS and applications running concurrently on different hosted VMs of the host server system may differ.

Like any physical PC or workstation, each VM 12 may be configured as a node of one or more computer networks. In the illustrated example, VMs 12A and 12B are nodes of network 14, which also includes client devices 20A and 20B. In the illustrated configuration, host server system 18 provides network access to the one or more hosted VMs. Plural VMs may be joined to the same network or to different networks, depending on the implementation.

Network 14 of cloud-computing environment 10 is a software-defined network (SDN). The SDN approach provides valuable flexibility in network configuration. Without any hardware manipulation, a new SDN with VMs and client devices as nodes may be created in a cloud-computing environment. Nodes may be added to or deleted from the network, renamed, and dynamically assigned new internet protocol (IP) addresses, for example, and when an SDN is no longer needed it may be promptly dissolved. Moreover, the SDN approach enables the same physical network to be shared across multiple workloads, by virtualizing the address range by which the nodes of the network are accessed.

Despite these advantages, rational operation of any computer network requires that each network node is provided at least some information as to the configuration of the network. Typically, this information takes the form of a network configuration update (NCU)—a data structure configured to reflect a change in the SDN configuration.

In some examples, an NCU may specify a new internet protocol (IP) address of one or more VMs on an SDN. For instance, reconfiguration of SDN 14 may result in VMs 12A and 12B being detached from their previous IP addresses and assigned new IP addresses. A suitably configured NCU may specify the new IP address for each of the affected VMs. In some examples, a new IP address may be specified even for the VM receiving the NCU, and even if the recipient VM is the only VM on the network. In some examples, the NCU may include a static route configuration update. One of the most useful features of an SDN is its ability to dynamically adjust its routing pattern pursuant to changes in the prevailing traffic pattern (i.e., the node- or area-specific demand for network bandwidth). When changes in routing are enacted by the SDN, such changes may be communicated to any connected VMs via an appropriate NCU. In still other examples, an NCU may include a domain-name server (DNS) configuration update, which reflects a change in one or more descriptors by which network elements or services are accessed. More generally, an NCU may include any new configuration that is supported as part of a dynamic host configuration protocol (DHCP, vide infra). It will be noted that an NCU may be embodied in any type of data structure and/or encoding—binary, Unicode, ASCII, etc.

To furnish NCUs to the one or more VMs 12 of host server system 18, the host server system includes an NCU service 16. The NCU service is configured to issue an NCU for consumption by any VM on SDN 14 pursuant to a reconfiguration of the SDN. In some examples, the NCU service is implemented from dedicated host server hardware components (e.g., processors and/or computer memory) specifically tasked to the objective of issuing NCUs to one or more VMs of the host server system. In some examples, the NCU service may determine which of a plurality of VMs on a reconfigured software-defined network would be affected by the reconfiguration and should therefore receive the NCU. Here, the NCU service may issue the NCU for consumption by those VMs only. In other examples, an NCU may be issued for all VMs on a reconfigured SDN.

Conveniently, an NCU issued by NCU service 16 may be retrieved by a recipient VM 12 via a standard dynamic host configuration protocol (DHCP). DHCP is used by state-of-the-art computer OSs for dynamic assignment of identity and other networking parameters to the nodes of a network. As an example, DHCP may be supported by kernel 34 of the OS 30 of each VM. However, DHCP is primarily a client-driven protocol; in typical implementations, it cannot directly cause an NCU to be pushed out to a VM at the request of an NCU service.

Certain work-arounds may be used in a host server system in order to coerce a VM to issue a DHCP request and thereby retrieve a pending NCU. One tactic is to force the VM to reboot, which typically triggers a new DHCP request. Naturally, however, this mechanism is disruptive to any workflow that may be ongoing on the VM, for it triggers the OS to needlessly stop and restart numerous operations which are unrelated to the NCU. Another tactic is for the host server system to grant the VM, in succession, a series of short-term, renewable DHCP leases to a software-defined network in lieu of a longer-term or indefinite lease. Expiry of a short-term lease typically triggers a new DHCP request by the VM, at which point a renewed lease is provided by the host server system, together with the NCU. That mechanism is akin to polling; it increases DHCP handshake traffic, puts additional load on the DHCP server and on the VM, and exposes the VM to a risk of network outage (should the DHCP server be unavailable for any period of time). Moreover, consumption of an NCU in the above work-around would still need to await expiry of the current lease on every VM for which it is intended. Such a delay could be problematic, especially in scenarios in which the identity parameters of the VM, such as the IP address itself, have changed.

To address these defects and provide still other advantages, NCU service 16 of host server system 18 supports a sideband mechanism to effectively push out any available NCU, but without requiring frequent VM reboots or lease renewals. The mechanism here disclosed supports previously untenable operations, including rapid switching of VMs into totally different networks, as well as prompt delivery of updated configurations—e.g., new DNS server configurations.

Continuing in FIG. 1, OS 30 of each VM 12 includes a network-interface card (NIC) driver 36. In the hypothetical case in which the OS were running directly on a non-virtualized machine, the NIC driver would receive hardware notifications—e.g., interrupt requests (IRQs)—from a physical NIC installed in the machine and connected to a network by a cable. For instance, the NIC might connect to a local-area network (LAN) via an Ethernet cable. There, a link-state notification (LSN) would be raised by the NIC in response to initial connection or reconnection of the network cable. An LSN includes data configured to indicate the state of network connectivity of a computer system. In a non-virtualized machine an LSN may take the form of a binary value asserted on one or more data lines of the NIC. In some OSs, receipt of an LSN by the NIC driver automatically triggers a new DHCP request by kernel 34.

In each VM 12, however, NIC driver 36 is communicatively coupled to host network 38 through a virtual port of a virtual network card (VNIC) 40 (VNIC 40A, 40B, etc.). The VNIC, in turn, is connected to a virtual network switch 42, which regulates the exchange of data with the host network. Since the virtual port is non-physical, certain properties normally detected by NIC driver 36 and subsequently handled in kernel 34 have no physical significance in the VM implementation. In particular, LSNs may be disabled in any VNIC 40, because there is no physical cable to be connected to the virtual port. However, the LSN-detecting and handling functions of OS 30 remain intact and may be repurposed in order to coerce a DHCP request as desired from any VM.

Accordingly, NCU service 16 of host server system 18 is configured to assert an LSN to the VNIC of a specified VM 12 whenever an NCU for that VM becomes available. In the VM environment, where there is no physical NIC, the LSN may take the form of data provided via virtual network switch 42. In one example, a goal state comparison mechanism is used to identify the state programmed on the VNIC as against a desired goal state. Whenever there is a mismatch, the NCU service delivers the LSN to the VNIC. The LSN is detected by the NIC driver and handled by the kernel just as though a cable were reconnected to a physical port serviced by the driver. An advantage of this approach is that this uses the existing capabilities of the OS, typically with no custom code or agent needed within the VM. Many operating systems have capability to detect a change in the link state and to initiate a DHCP exchange when this occurs. In some examples, the DHCP exchange initiated by the VM receiving the LSN may take the form of a network 'handshake,' in which the sender and the recipient exchange data that defines the parameters of subsequent communication.

Despite the above advantages, an optional link-state monitor (LSM) agent 44 may be provided in some examples as a background executable running on any VM 12. The LSM agent may be configured to handle any LSN event that escapes unhandled from kernel 34. Like NIC driver 36, the LSM agent may be configured to initiate a DHCP exchange in response to the LSN.

No aspect of the foregoing drawings or description should be understood in a limiting sense, because numerous variations, extensions, and omissions are also envisaged. For instance, in implementations in which the LSN is handled adequately by the OS kernel, optional LSM agent 44 may be omitted. In some examples, the various computer systems of cloud-computing environment 10 may communicate via a private wide-area network (WAN) in lieu of public network 28. In some examples, an SDN may be comprised entirely of VMs, which communicate to client devices 20 on a different network.

Figure 4:
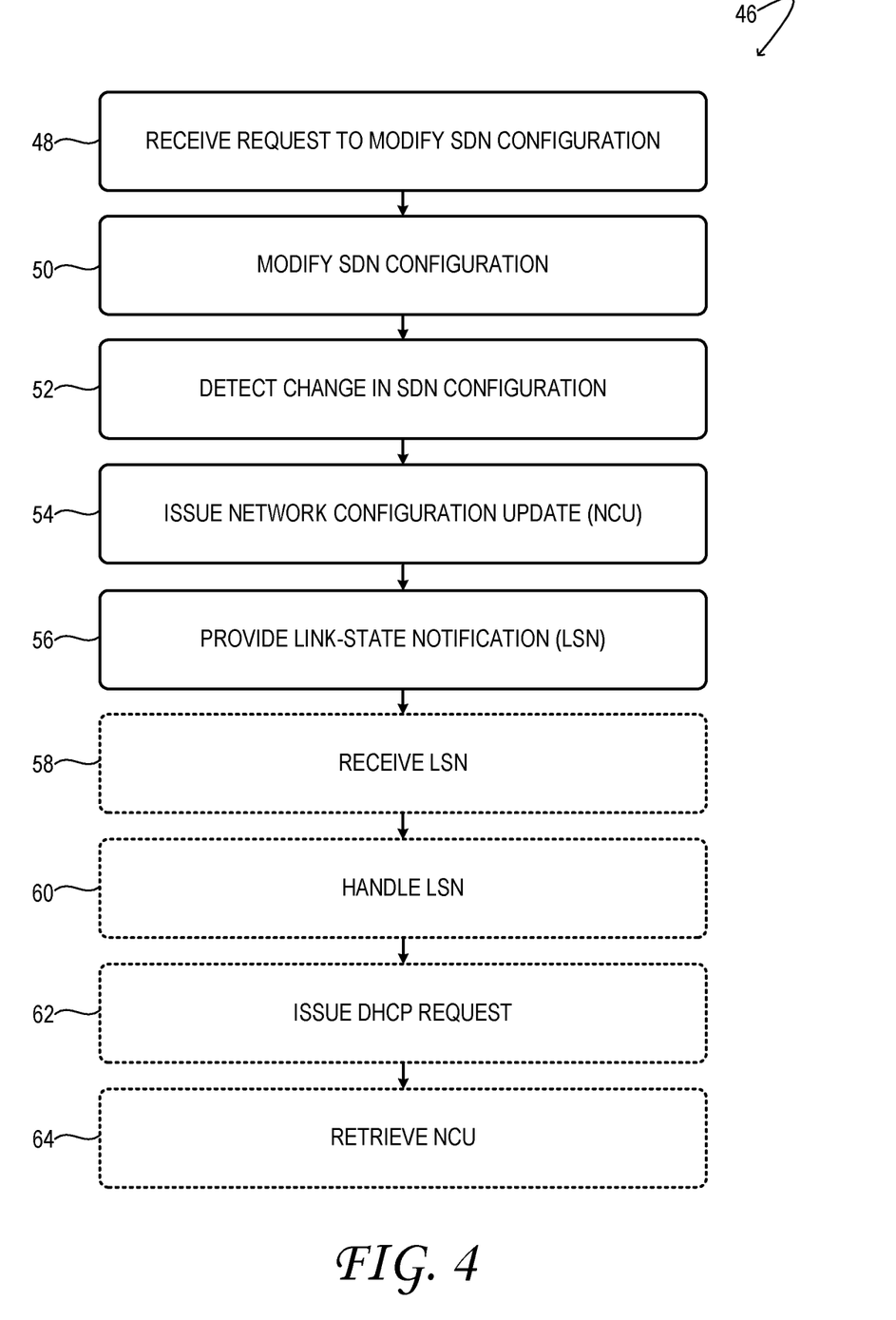
FIG. 4 illustrates an example method to provide network connectivity to a virtual machine hosted on a server computer system.

FIG. 4 illustrates an example method 46 to provide network connectivity to a virtual machine hosted on a server computer system, such as host server system 18. The method may be enacted by logic of the host server system.

At 48 of method 46, a request is received by the host server system (or by an associated system) to modify the configuration of an SDN to which the host server system provides access. In one example, such a request may originate from a client device. In other examples, the request may originate from a host network provider or elsewhere on the network. At 50 the host server system (or associated system) modifies the SDN configuration pursuant to the request—adding or deleting nodes, reassigning IP addresses, etc. At 52 the change in the SDN configuration is detected by an NCU service of the host server system.

At 54 the NCU service issues an NCU for consumption by each of the one or more VMs on the reconfigured SDN, or by each VM that would be affected by the change in the network configuration. The NCU is configured to reflect the change in the network configuration, as described hereinabove. In some examples, the NCU may include an IP address for one or more virtual machines connected to the modified SDN. In some examples, the NCU may include a DNS configuration update.

At 56 the NCU update service provides an LSN to the one or virtual machines to which the NCU is issued. Generally speaking, the LSN may include a Boolean indication of a link state between the recipient VM and the SDN—e.g., CONNECTED versus NOT CONNECTED. In some examples, the LSN includes emulated notification of reconnection of a network cable to a VNIC of each recipient VM. In some examples, the LSN may further include an indication of the connection speed through a virtual port of the VNIC.

At 58 the LSN is received by the one or more VMs. At 60 the LSN is detected by the NIC driver of each VM and handled by the associated OS kernel. At 62 the OS kernel of each VM that has received the LSN issues a DHCP request, which may take the form of a handshake. At 64 the NCU issued for consumption by each VM is received by that VM via the DHCP protocol, pursuant to the DHCP request initiated by the OS of the VM. In this manner, network connectivity is maintained for all VMs on the reconfigured SDN.

Figure 5:
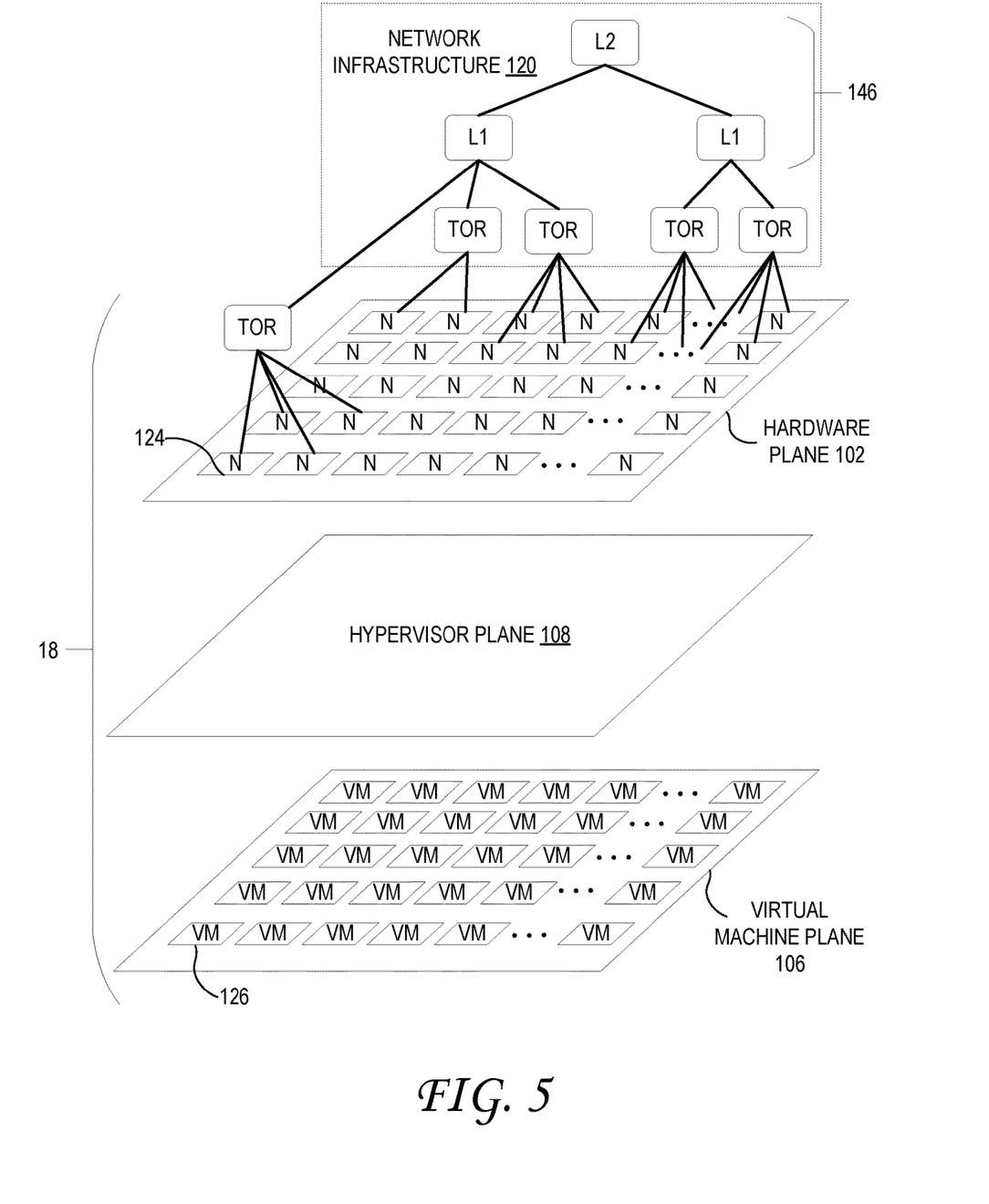
FIGS. 5 and 6 show aspects of an example host server system.
Figure 6:
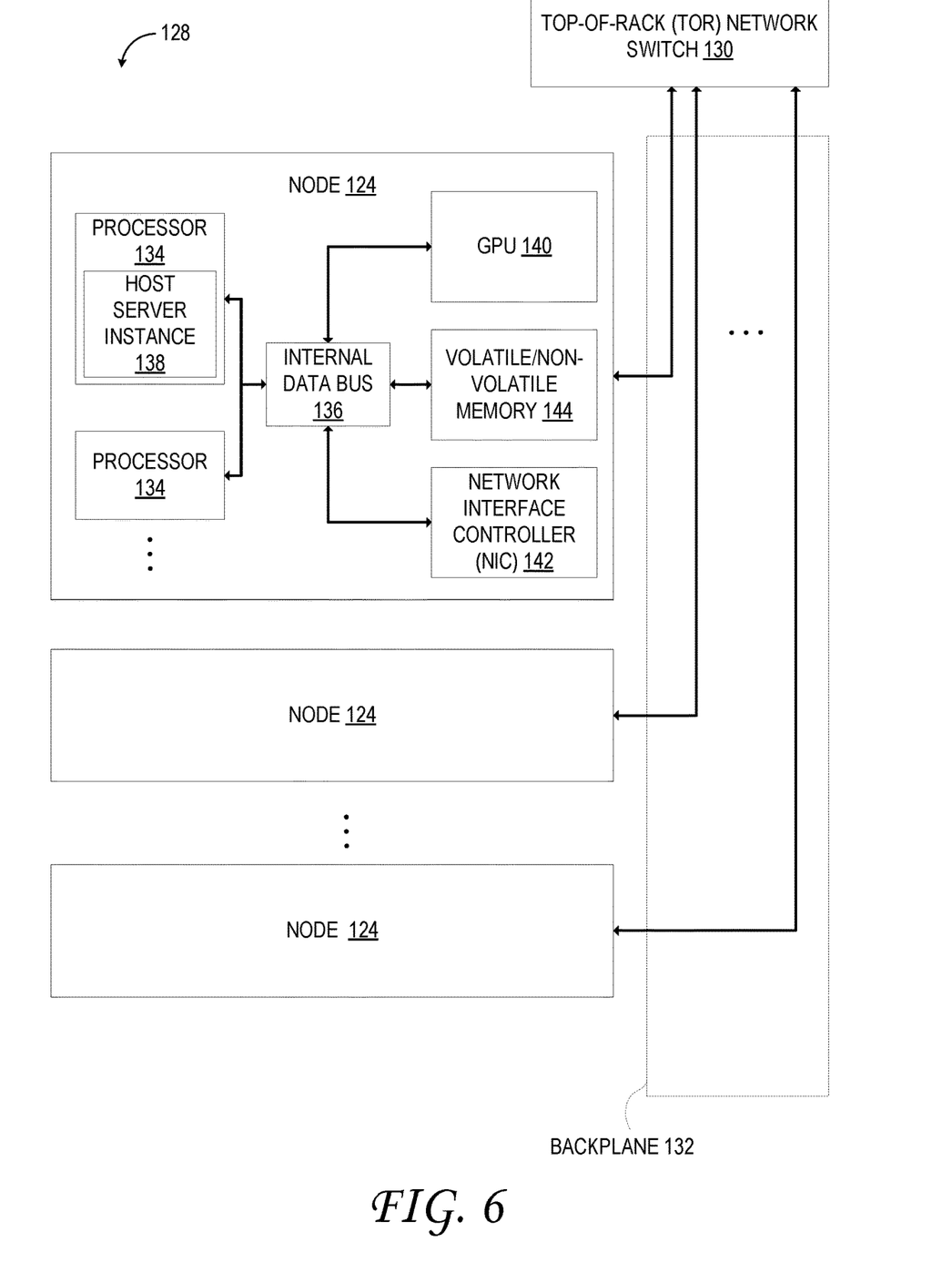

FIGS. 5 and 6 provide additional operational context for host server system 18 in one, nonlimiting example. In particular, FIG. 5 shows aspects of a host server system that includes a hardware plane 102, a VM plane 106, a hypervisor plane 108, and network infrastructure 120, which are collectively configured to operate cloud computing environment 10. Hardware plane 104 includes a collection of hardware nodes 124 (each denoted by the symbol 'N' in FIG. 5), which may include processors, GPUs, volatile memory, and other computer components configured to run host server instances. The host server instances executed by the hardware nodes 124 of the hardware plane 102 are configured to communicate with one or more hypervisors of the hypervisor plane 108. The one or more hypervisors of the hypervisor plane 108 may create, handle, and monitor a plurality of VMs 12 (each denoted by the symbol 'VM' in FIG. 5) of the VM plane 106. Through the hypervisor plane 108, each VM 12 of the VM plane 106 may be hosted and run by the hardware components of one or more hardware nodes 124 of the hardware plane 104. In this manner, the plurality of VMs 12 of the VM plane 106 may share virtualized hardware resources managed by the hypervisor plane 108. For instance, virtual network switch 42 of FIG. 3 may reside on hypervisor plane 108. Each VM 12 provides a simulated computer environment within which guest software, such as, for example, OS 30 and applications 32 may be executed.

In one example, host server system 18 corresponds to a data center environment configured to operate cloud-computing environment 10, which communicatively couples the plurality of hardware nodes 124 via standard network infrastructure.

Turning now to FIG. 6, the plurality of hardware nodes 124 may be organized into a plurality of hardware node clusters 128. Each hardware node cluster 128 may include a top-of-rack (TOR) network switch 130, two or more hardware nodes of the plurality of hardware nodes 124, and a backplane 132 communicatively coupling the top-of-rack network switch 130 and hardware nodes 124. For example, each hardware node cluster 128 may correspond to a server rack that provides physical structure, ventilation, etc., for a TOR switch 130 and a plurality of hardware nodes 124, which are located physically proximate to each other in the same server rack. The backplane 132 communicatively coupling each hardware node in the server rack may facilitate a low-latency and high-bandwidth exchange of network packets among hardware nodes in the same server rack.

As illustrated in FIG. 6, each hardware node 124 of hardware node cluster 128 includes at least one processor 134 communicatively coupled to other hardware components by an internal data bus 136. The at least one processor 134 may execute a host server instance 138. As shown, each server may include more than one processor 124 that may each execute separate host server instances 138, or may collectively execute a single host server instance. The one or more host server instances 138 executed by one or more processors 134 may be configured to collectively perform the functions and capabilities of the host server system 12 described herein with reference to FIGS. 2 and 3.

In one example, the internal data bus 136 may take the form of a Peripheral Component Interconnect Express (PCIe) link, for example. Data buses of other formats may alternatively be used. It should be appreciated that 'internal' as used in the term 'internal data bus' refers to the fact that at least a portion of the data bus is typically housed in the same housing (which serves as a Faraday cage) as the processor 134 of the hardware node 124, and should be understood to encompass a data bus that connects a processor of a hardware node in a housing with internally mounted hardware components and/or to externally coupled hardware components plugged into, e.g., a port on an external surface of the housing of the hardware node. As illustrated, each hardware node 124 may include other suitable hardware components, such as, for example, a GPU 140, a network interface controller (NIC) 142, volatile and non-volatile memory 144, etc. It should be appreciated that the hardware nodes 124 are not limited to the illustrated hardware components, but may include any suitable configuration of hardware components configured for operating cloud-computing environment 10. Additionally, it should be appreciated that while the hardware nodes 124 are illustrated as being clustered in a server rack configuration, other types of network infrastructure and housing configurations may be utilized to couple the plurality of hardware nodes 124 and operate the cloud-computing environment 10.

Returning now to FIG. 5, the network infrastructure 120 may include typical network infrastructure to couple the hardware nodes 124 within a hardware node cluster together, such as server racks including TOR network switches. The host server system 18 may include a plurality of hardware node clusters that each have an associated TOR network switch, and may have the architecture described in FIG. 6. Network infrastructure 120 may further include higher-level switching infrastructure 146 (L1) and (L2) that connects the TOR network switches together. The higher-level switching infrastructure 146 may take the form of any suitable networking architecture, and may be driven by any suitable routing protocol(s). In the illustrated example, the higher-level infrastructure 146 includes a collection of aggregation switches L1 and core switches L2. However, it will be appreciated that the higher-level switching infrastructure may include any suitable number of levels of switches.

Each host server instance 138 executed via processors 134 of the hardware nodes 124 may communicate with other host server instances 138 through the network infrastructure 120. The collective host server instances 138 manages the collective hardware resources of the hardware plane 102, which may be utilized to run the VMs 12 of the VM plane 106 through the hypervisor plane 108. In one example, the utilization by VM 12 of hardware resources of the host hardware nodes of hardware plane 102 may be controlled by the hypervisor plane 108, such that VMs 12 do not directly access hardware nodes 124 themselves. The VMs 12 of the VM plane 106 provide a virtual computing environment within which users of the client computer devices 20A, 20B, 20C, 20D, etc. may execute OS 30 and applications 32 described above with reference to FIG. 3. During execution of an application 32, the hypervisor plane 108 may allocate hardware resources of one or more hardware nodes 124 of the hardware plane 102 to run the application. The hypervisor plane 108 may allocate the hardware resources of the hardware nodes 124 in a changeable and scalable manner, such that additional hardware nodes 124 may be allocated to a particular VM 12, and already allocated hardware nodes 124 may be reduced, transferred, or otherwise changed for that particular VM 12 while the cloud application is running.

As noted above, the methods and processes herein may be implemented by a system of one or more computing machines. FIG. 2 schematically shows a nonlimiting embodiment of a host server system 18 that can enact one or more of the methods and processes described herein.

Logic system 22 of host server system 18 includes one or more physical devices configured to execute instructions. For example, the logic system may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic system 22 may include one or more processor machines configured to execute software instructions. Additionally, the logic system may include one or more hardware or firmware logic machines configured to execute hardware or firmware instructions. Processor machines of the logic system may be single-core or multi-core, and the instructions executed thereon may be configured for sequential, parallel, and/or distributed processing. Individual components of the logic system optionally may be distributed among two or more separate machines, which may be remotely located and/or configured for coordinated processing. Aspects of the logic system may be virtualized and executed by remotely accessible, networked computing devices configured in a cloud-computing configuration.

Computer-memory system 24 of host server system 18 includes one or more physical devices configured to hold instructions executable by logic system 22 to implement the methods and processes described herein. When such methods and processes are implemented, the state of the computer-memory system may be transformed—e.g., to hold different data.

Computer-memory system 24 may include removable and/or built-in devices. The computer-memory system may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, tape drive, MRAM, etc.), among others. The computer-memory system may include volatile, nonvolatile, dynamic, static, read/write, read-only, random-access, sequential-access, location-addressable, file-addressable, and/or content-addressable memory devices.

It will be appreciated that computer-memory system 24 includes one or more physical devices. However, aspects of the instructions described herein alternatively may be propagated by a communication medium (e.g., an electromagnetic signal, an optical signal, etc.) that is not held by a physical device for a finite duration.

Aspects of logic system 22 and computer-memory system 24 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms 'module,' 'program,' and 'engine' may be used to describe an aspect of host server system 18 implemented to perform a particular function. In some cases, a module, program, or engine may be instantiated via logic system 22 executing instructions held by computer-memory system 24. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms 'module,' program,' and 'engine' may encompass individual or groups of executable files, data files, libraries, drivers, scripts, database records, etc.

It will be appreciated that a 'service', as used herein, is a program executable across multiple sessions. A service may be available to one or more system components, programs, and/or other services. In some implementations, a service may run on one or more server-computing devices.

When included, a display system may be used to present a visual representation of data held by computer-memory system 24. This visual representation may take the form of a graphical user interface (GUI). As the herein described methods and processes change the data held by the computer-memory system, and thus transform the state of the computer-memory system, the state of the display system may likewise be transformed to visually represent changes in the underlying data.

Network-communication system 26 of host server system 18 is configured to communicatively couple host server system 18 to one or more other computing devices. The network-communication system may include wired and/or wireless communication devices compatible with one or more different communication protocols. As nonlimiting examples, the network-communication system may be configured for communication via a wired or wireless local- or wide-area network. In some embodiments, the network-communication system may allow host server system 18 to send and/or receive messages to and/or from other devices via a network such as the internet.

One aspect of this disclosure is directed to a method to provide network connectivity to a virtual machine hosted on a server computer system. Enacted on the server computer system, the method comprises: detecting a change in a configuration of a software-defined network to which the server computer system provides access; issuing a network configuration update (NCU) for consumption by the virtual machine, the NCU including a data structure reflecting the change in the configuration; and providing a link-state notification (LSN) to a virtual network interface card of the virtual machine pursuant to the change in the configuration, the LSN including data indicating a state of network connectivity of the virtual machine. In this method, receipt of the LSN by the virtual machine triggers a dynamic host configuration protocol (DHCP) handshake by the virtual machine, and the NCU is received by the virtual machine pursuant to the DHCP handshake.

In some implementations, the server computer system includes a virtual network switch, and the LSN is provided via the virtual network switch. In some implementations, the LSN includes emulated notification of reconnection of a network cable. In some implementations, the virtual machine is one of a plurality of virtual machines hosted on the server computer system, and the LSN is provided to each of the plurality of virtual machines. In some implementations, the NCU includes an internet protocol address for one or more virtual machines connected to the software-defined network. In some implementations, the NCU includes a domain name server configuration update.

Another aspect of this disclosure is directed to a server computer system comprising: a network-communication system; one or more processors; and operatively coupled to the one or more processors, computer memory holding instructions that, when executed by the one or more processors, cause the one or more processors to: host a virtual machine on the server computer system, provide access to a software-defined network to the virtual machine, detect a change in a configuration of the software-defined network, issue a network configuration update (NCU) for consumption by the virtual machine—the NCU including a data structure reflecting the change in the configuration, and provide a link-state notification (LSN) to the virtual machine—the LSN including data indicating a state of network connectivity of the virtual machine.

In some implementations, the virtual machine includes a virtual network interface card, and the LSN is provided to the virtual network interface card. In some implementations, the LSN specifies a connection speed through a virtual port of the virtual machine. In some implementations, the virtual machine is one of a plurality of virtual machines hosted on the server computer system and the LSN is provided to each of the plurality of virtual machines. In some implementations, the NCU includes an internet protocol address for one or more virtual machines connected to the software-defined network. In some implementations, the NCU includes a domain name server configuration update. In some implementations, receipt of the LSN by the virtual machine triggers a dynamic host configuration protocol (DHCP) handshake by the virtual machine, and the NCU is received by the virtual machine pursuant to the DHCP handshake.

Another aspect of this disclosure is directed to a server computer system comprising: a network-communication system; one or more processors; and operatively coupled to the one or more processors, computer memory holding instructions that, when executed by the one or more processors, cause the one or more processors to: host a virtual machine on the server computer system, provide access to a software-defined network to the virtual machine, in response to a change in a configuration of the software-defined network issue a network configuration update (NCU) for consumption by the virtual machine—the NCU including a data structure reflecting the change in the configuration, and provide a link-state notification (LSN) to the virtual machine—the LSN including data indicating a state of network connectivity of the virtual machine. In this server computer system, receipt of the LSN by the virtual machine triggers a dynamic host configuration protocol (DHCP) handshake by the virtual machine, and the NCU is received by the virtual machine pursuant to the DHCP handshake.

In some implementations, the virtual machine is one of a plurality of virtual machines hosted on the server computer system and the LSN is provided to each of the plurality of virtual machines. In some implementations, the network configuration update includes an internet protocol address for one or more virtual machines connected to the software-defined network. In some implementations, the server computer system further comprises a link-state monitor agent executing on the virtual machine and configured to trigger the DHCP handshake in response to the LSN. In some implementations, the server computer system further comprises an operating system with a network interface card (NIC) driver executing on the virtual machine, wherein the NIC driver is configured to detect the LSN. In some implementations, the NIC driver is communicatively coupled to a host network of the server computer system through a virtual port of a virtual network card of the virtual machine. In some implementations, the LSN is provided to the virtual network card.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method to provide network connectivity to a virtual machine hosted on a computer system, the method comprising:
   detecting a change in a configuration of a software-defined network to which the computer system provides access;
   in response to detecting the change, generating a network configuration update (NCU) including a data structure reflecting the change in the configuration;
   simulating a network cable connect event by providing a link-state notification (LSN) to a virtual network interface card of the virtual machine in response to the change in the configuration, the LSN including data indicating a state of network connectivity of the virtual machine;
   in response to the LSN, initiating a dynamic host configuration protocol (DHCP) handshake by the virtual machine; and
   receiving the NCU by the virtual machine in response to the DHCP handshake.

2. The method of claim 1 wherein the computer system includes a virtual network switch, and wherein the LSN is provided via the virtual network switch.

3. The method of claim 1 wherein the LSN includes emulated notification of reconnection of a network cable.

4. The method of claim 1 wherein the virtual machine is one of a plurality of virtual machines hosted on the computer system, and wherein the LSN is provided to each of the plurality of virtual machines.

5. The method of claim 1 wherein the NCU includes an internet protocol address for one or more virtual machines connected to the software-defined network.

6. The method of claim 1 wherein the NCU includes a domain name server configuration update.

7. A system comprising:
   one or more processors; and
   operatively coupled to the one or more processors, computer memory storing instructions that, when executed by the one or more processors, cause the system to:
   host a virtual machine,
   provide access to a software-defined network to the virtual machine,
   detect a change in a configuration of the software-defined network,
   generate a network configuration update (NCU) including a data structure reflecting the change in the configuration; and
   simulate a network cable connect event by providing a link-state notification (LSN) to the virtual machine, the LSN including data indicating a state of network connectivity of the virtual machine.

8. The system of claim 7 wherein the virtual machine includes a virtual network interface card, and wherein the LSN is provided to the virtual network interface card.

9. The system of claim 8 wherein receipt of the LSN by the virtual machine triggers a dynamic host configuration protocol (DHCP) handshake by the virtual machine, and wherein the NCU is received by the virtual machine in response to the DHCP handshake.

10. The system of claim 7 wherein the LSN specifies a connection speed through a virtual port of the virtual machine.

11. The system of claim 7 wherein the virtual machine is one of a plurality of virtual machines hosted on the system and wherein the LSN is provided to each of the plurality of virtual machines.

12. The system of claim 7 wherein the NCU includes an internet protocol address for one or more virtual machines connected to the software-defined network.

13. The system of claim 7 wherein the NCU includes a domain name server configuration update.

14. A system comprising:
one or more processors; and
operatively coupled to the one or more processors, computer memory storing instructions that, when executed by the one or more processors, cause the system to:
host a virtual machine,
provide access to a software-defined network to the virtual machine,
in response to a change in a configuration of the software-defined network, generate a network configuration update (NCU) including a data structure reflecting the change in the configuration;
simulate a network cable connect event by providing a link-state notification (LSN) to the virtual machine, the LSN including data indicating a state of network connectivity of the virtual machine,
in response to the LSN, initiate a dynamic host configuration protocol (DHCP) handshake by the virtual machine; and
receive the NCU by the virtual machine in response to the DHCP handshake.

15. The system of claim 14 wherein the virtual machine is one of a plurality of virtual machines hosted on the system and wherein the LSN is provided to each of the plurality of virtual machines.

16. The system of claim 14 wherein the network configuration update includes an internet protocol address for one or more virtual machines connected to the software-defined network.

17. The system of claim 14 further comprising a link-state monitor agent executing on the virtual machine and configured to trigger the DHCP handshake in response to the LSN.

18. The system of claim 14 further comprising an operating system with a network interface card (NIC) driver executing on the virtual machine, wherein the NIC driver is configured to detect the LSN.

19. The system of claim 18 wherein the NIC driver is communicatively coupled to a host network of the system through a virtual port of a virtual network card of the virtual machine.

20. The system of claim 19 wherein the LSN is provided to the virtual network card.

* * * * *